US010850358B2

(12) United States Patent
Arthur et al.

(10) Patent No.: US 10,850,358 B2
(45) Date of Patent: Dec. 1, 2020

(54) SPINDLE LOCKING APPARATUS FOR A ROTARY POWER TOOL

(71) Applicants: Robert Arthur, Trenton, MI (US); Nathaniel P Wenzel, Lyndhurst, OH (US); Nicholas J Russell, Kirtland, OH (US); Michael J Flaherty, Westland, MI (US)

(72) Inventors: Robert Arthur, Trenton, MI (US); Nathaniel P Wenzel, Lyndhurst, OH (US); Nicholas J Russell, Kirtland, OH (US); Michael J Flaherty, Westland, MI (US)

(73) Assignee: G.A.W. Inc., Romulus, MI (US)

( * ) Notice: Subject to any disclaimer, the term of this patent is extended or adjusted under 35 U.S.C. 154(b) by 86 days.

(21) Appl. No.: 16/205,821

(22) Filed: Nov. 30, 2018

(65) Prior Publication Data

US 2020/0171613 A1    Jun. 4, 2020

(51) Int. Cl.
*B23Q 11/00* (2006.01)
*B25B 33/00* (2006.01)
*B25F 5/00* (2006.01)

(52) U.S. Cl.
CPC ........ *B23Q 11/0092* (2013.01); *B25B 33/005* (2013.01); *B25F 5/001* (2013.01)

(58) Field of Classification Search
CPC .... B23Q 11/0092; B23B 33/005; B25F 5/001
USPC ........................................................ 173/213
See application file for complete search history.

(56) References Cited

U.S. PATENT DOCUMENTS

| 4,234,227 | A | * | 11/1980 | Faust | A47C 4/024 |
| | | | | | 297/440.18 |
| 5,496,139 | A | | 3/1996 | Ghode et al. | |
| 5,810,366 | A | * | 9/1998 | Montjoy | B23B 31/202 |
| | | | | | 279/43 |
| 7,052,022 | B2 | * | 5/2006 | Chudy | B23Q 3/12 |
| | | | | | 279/143 |
| 7,980,325 | B2 | | 7/2011 | Botefuhr et al. | |
| 9,724,816 | B2 | | 8/2017 | Hecht et al. | |
| 9,855,649 | B2 | | 1/2018 | Schnell et al. | |
| 2010/0252292 | A1 | * | 10/2010 | Pyles | B24B 23/022 |
| | | | | | 173/164 |

* cited by examiner

*Primary Examiner* — Nathaniel C Chukwurah
(74) *Attorney, Agent, or Firm* — Mark A. Navarre

(57) ABSTRACT

A spindle locking apparatus for power tools having a spindle mounted for rotation within a tubular housing. The locking apparatus includes a locking sleeve disposed between the spindle and its tubular housing, a locking collar surrounding the tubular housing radially outboard of the locking sleeve, and a set of drive pins mechanically coupling the locking collar to the locking sleeve through axial slots in the tubular collar. The inner periphery of the locking sleeve is shaped to lockingly engage a flat-sided portion of the spindle, and a spring element biases the locking sleeve away from the flat-sided portion of the spindle to unlock the spindle. The locking collar is axially shiftable against the spring bias as permitted by the slots in the tubular housing to bring the locking sleeve into locking engagement with the flat-sided portion of the spindle to prevent spindle rotation.

10 Claims, 4 Drawing Sheets

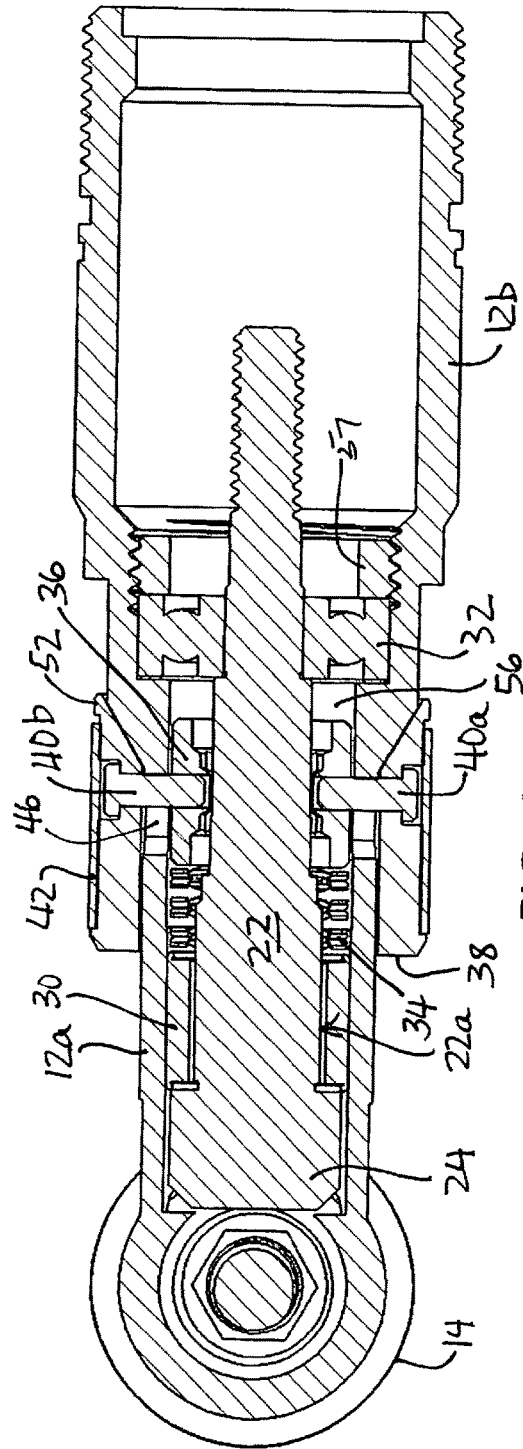
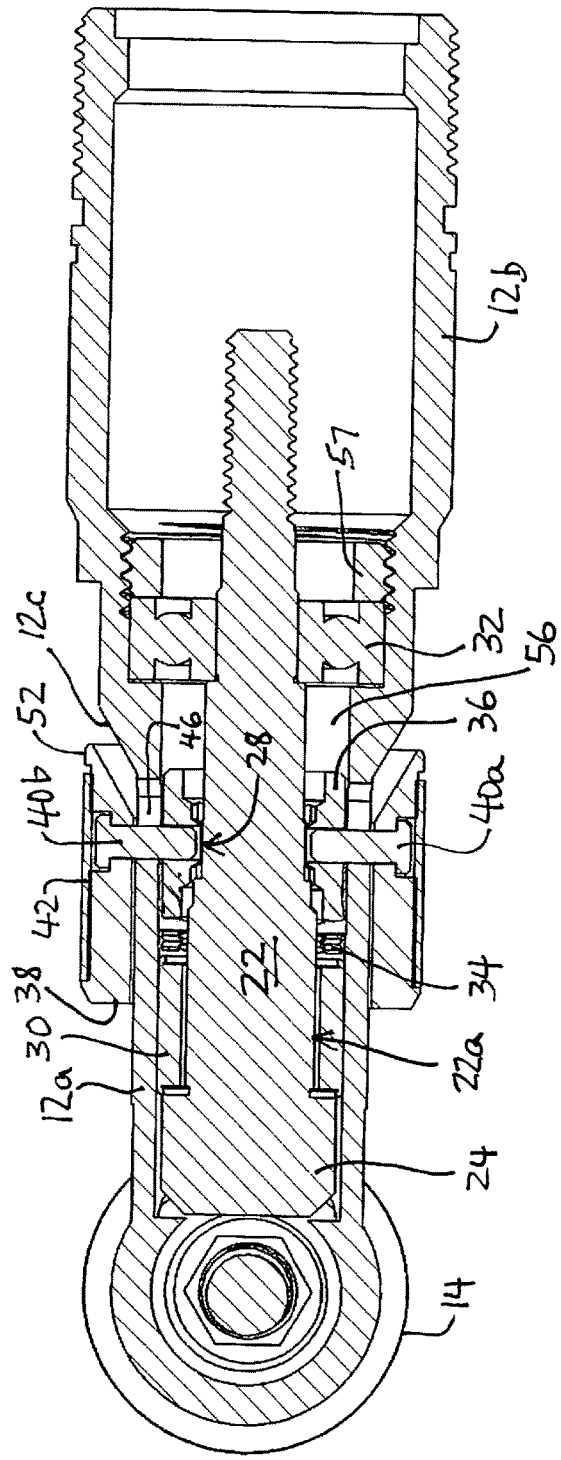

SPINDLE LOCKING APPARATUS FOR A ROTARY POWER TOOL

TECHNICAL FIELD

This invention relates to power tools having a rotary spindle or shaft, and more particularly to a user-manipulated spindle locking apparatus for selectively preventing spindle rotation.

BACKGROUND OF THE INVENTION

Rotary power tools, particularly those incorporating a collet for securing a drill bit or other rotary bit, will frequently incorporate a drive shaft locking apparatus to enable a user to tighten or loosen the collet without also turning the drive shaft; see, for example, the U.S. Patent No. 5,496,139 to Ghode et al. Although less commonly, similar locking mechanisms can also be used in connection with angle grinders, routers, and other rotary power tools to enable a user to remove or install an implement such as a grinder wheel or router blade without also turning the spindle. Such locking mechanisms are typically designed into the power tool as an OEM (original equipment manufacturer) feature, and are not readily adaptable for retrofitting an existing power tool. Accordingly, what is needed is a spindle locking apparatus that is suitable for both OEM and retrofit applications.

SUMMARY OF THE INVENTION

The present invention is directed to an improved spindle locking apparatus that is readily adapted to both retrofit applications and OEM applications. The apparatus is designed for use in power tools having a spindle mounted for rotation within a tubular (annular) housing having an axis that coincides with that of the spindle. The spindle is generally cylindrical, but includes a flat-sided (hex-shaped, for example) portion with which the locking apparatus interacts. The locking apparatus includes an axially shiftable locking sleeve disposed between the spindle and its tubular housing, an axially shiftable locking collar radially outboard of the tubular housing and locking sleeve, and a set of drive pins mechanically coupling the locking collar to the locking sleeve through axial slots in the tubular collar. The inner periphery of the locking sleeve is shaped to lockingly engage the flat-sided portion of the spindle, and a spring element biases the locking sleeve (and locking collar) away from the flat-sided portion of the spindle, defining a rest or unlocked position of the apparatus. To lock the spindle, the user shifts the locking collar axially against the spring bias as permitted by the slots in the tubular housing to bring the locking sleeve into locking engagement with the flat-sided portion of the spindle. The spring returns the locking sleeve (and locking collar) to the un-locked position when the user releases the locking collar.

The apparatus is particularly well suited to retrofit applications because the locking sleeve is easily inserted into the space between the spindle and its tubular housing, and because the locking collar can be constructed as a two-piece split ring that is joined to surround the tubular housing. In a preferred embodiment, the split ring halves, when joined, are mutually secured with a one-piece spring steel clamp.

BRIEF DESCRIPTION OF THE DRAWINGS

FIGS. 4 and 5 are cross-sectional top views of the front housing assembly of FIG. 1, with the grinder guard assembly removed. FIG. 4 depicts the spindle locking apparatus in an unlocked state, whereas FIG. 5 depicts the spindle locking apparatus in a locked state.

DESCRIPTION OF THE PREFERRED EMBODIMENT

The spindle locking apparatus of this invention is designed for use in power tools having a spindle mounted for rotation within a tubular housing, where it is desirable to temporarily prevent the spindle from rotating with respect to the housing while attaching or removing implements driven by the spindle. One such power tool is an angle grinder having a threaded drive shaft, where abrasive grinding or cutting disks are secured to the drive shaft with a threaded fastener; in such tools, the spindle is mechanically coupled to the drive shaft, and it is desirable to rotationally lock the spindle (and drive shaft) when attaching or removing the threaded fastener.

Figure 1:
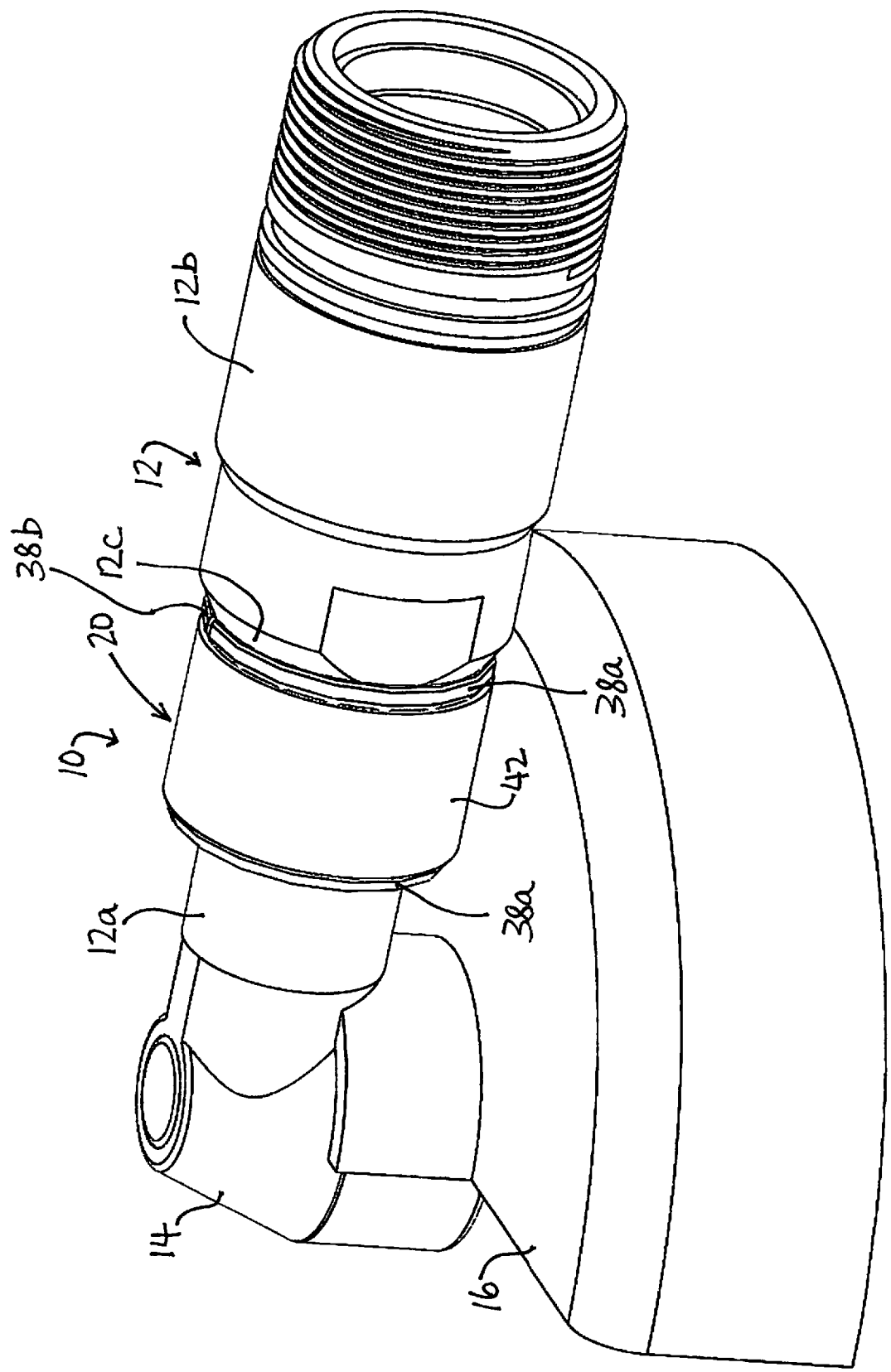
FIG. 1 is an isometric drawing of a front housing assembly of an angle grinder equipped with a spindle locking apparatus according to the present invention.
Figure 2:
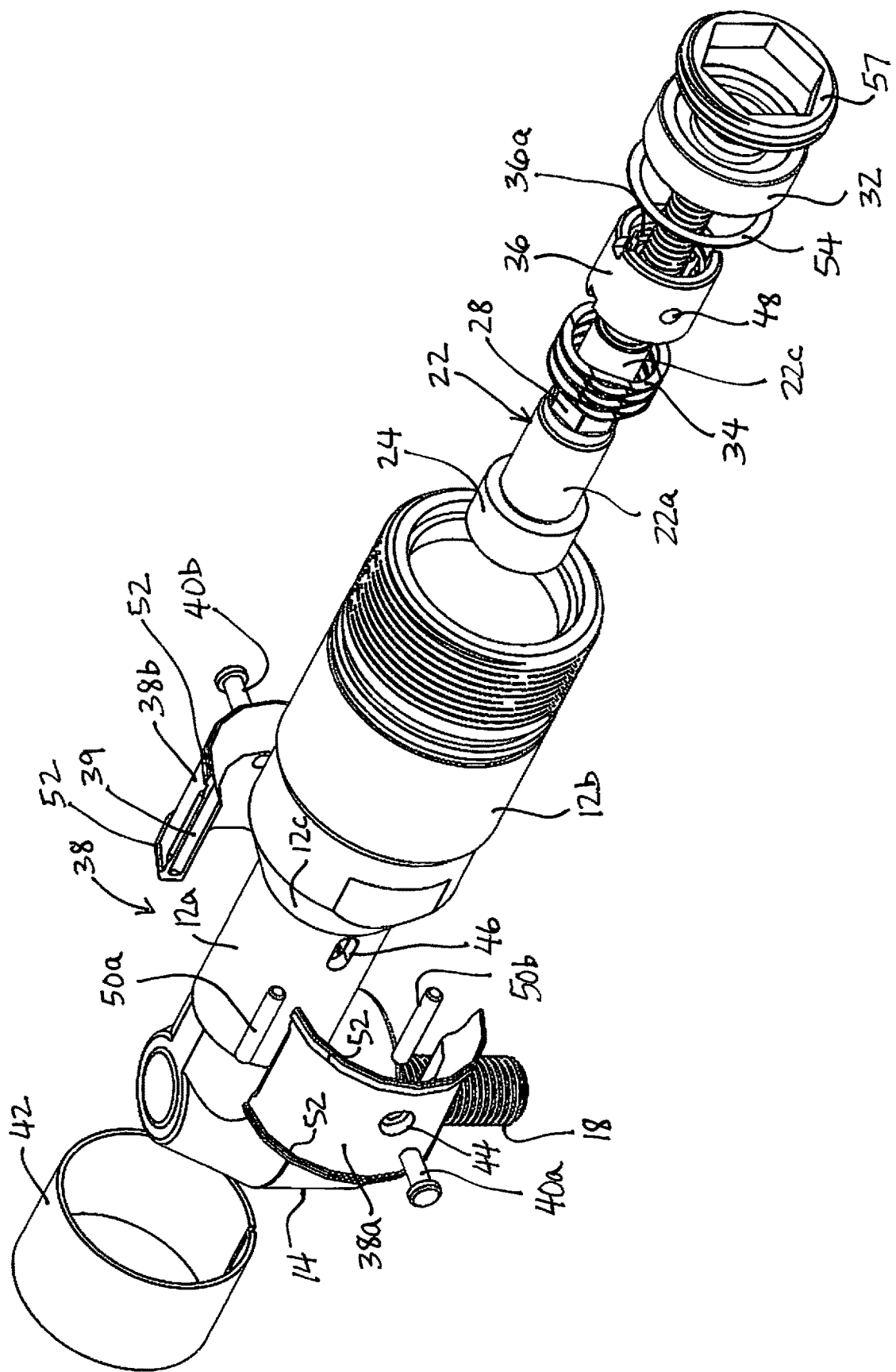
FIG. 2 is an exploded isometric diagram of the front housing assembly of FIG. 1, with the grinder guard assembly removed.

The locking apparatus of the present invention is illustrated herein in the context of an angle grinder, and the angle grinder's front housing assembly 10 is shown in the drawings. Referring to FIGS. 1-2, the front housing assembly 10 includes a tubular housing 12 and hub 14 (which are mechanically joined, or formed as one piece as shown), and a guard assembly 16 mounted on the hub 14 to partially encircle a grinding or cutting disk (not shown) affixed to a threaded pinion shaft or drive shaft 18 extending out of the hub 14. The tubular housing 12 includes a first portion 12*a* adjacent the hub 14 on which the spindle locking apparatus (generally designated by the reference numeral 20 in FIG. 1) is slidingly received, a second portion 12*b* of larger diameter axially outboard of the first portion 12*a*, and a conical portion 12*c* bridging the first and second portions 12*a* and 12*b*. The free end of the second portion 12*b* is threaded as shown for attachment to the angle grinder's motor housing (not shown).

As seen in the exploded view of FIG. 2, the front housing assembly 10 additionally includes a generally cylindrical spindle 22 supported for rotation within the tubular housing 12. The inboard end of spindle 22 is threaded for attachment to a motor or gearbox output shaft (not shown), and the outboard end is provided with a pinion gear 24 for engaging a beveled spur gear 26 (shown in FIGS. 3-5) in hub 14. Adjacent the inboard and outboard ends of spindle 22 are provided front and rear bearing surfaces 22*a* and 22*b*; and between the bearing surfaces 22*a* and 22*b* is a central portion 22*c* that terminates in a flat-sided feature 28 that cooperates with the spindle locking apparatus 20 as described below. The front bearing surface 22*a* is received within a sleeve bearing 30 (shown in FIGS. 3-5) mounted in tubular housing portion 12*a*, and the rear bearing surface 22*b* is received within a roller bearing 32 mounted in tubular housing portion 12*b*.

As seen in FIG. 2, the spindle locking apparatus 20 includes a spiral spring 34 (preferably a multi-wave disk spring as shown), a locking sleeve 36 having an inner periphery portion 36*a* that is flat-sided to lockingly engage the spindle's flat-sided feature 28, a two-piece locking collar 38 (comprising the collar halves 38*a* and 38*b*), a pair of drive pins 40*a*, 40*b*, and a spring band 42. The spiral spring 34 and locking sleeve 36 encircle the spindle 22 within the tubular housing portion 12*a*, whereas the locking collar 38 and spring band 42 encircle the outer periphery of the tubular housing portion 12*a*, radially outboard of the spiral spring 34 and locking sleeve 36. The drive pins 40*a* and 40*b* function to mechanically couple the locking collar 38 to the locking sleeve 36 so that when the locking collar 38 is shifted axially on the tubular housing portion 12*a* by a user, the locking sleeve 36 will correspondingly shift axially in the space between the spindle 22 and the inner periphery of tubular housing portion 12*a*. The drive pins 40*a* and 40*b* are inserted through a pair of oppositely disposed countersunk openings 44 formed in the locking collar halves 38*a*, 38*b*, through a pair of oppositely disposed slot openings 46 formed in the wall of tubular housing portion 12*a*, and into a pair of oppositely disposed openings 48 formed in the exterior periphery of locking sleeve 36. With the drive pins 40*a*, 40*b* so inserted, their heads are received the countersunk openings 44, and the spring band 42 is placed over the outer periphery of the joined locking collar halves 38*a*, 38*b*; this mutually secures the locking collar halves 38*a*, 38*b*, and retains the drive pins 40*a*, 40*b*.

The slot openings 46 in the wall of tubular housing portion 12*a* limit axial shifting of the locking collar/sleeve assembly due to their interference with the locking pins 40*a*, 40*b*, and also prevent rotation of the assembly with respect to the tubular housing 12. The spring 34 biases the assembly toward an inboard limit position (defined by the inboard end of the slot openings 46) in which the inner periphery portion 36*a* of locking sleeve 36 does not engage the flat-sided feature 28 of spindle 22, leaving the spindle 22 free to rotate; this state of the spindle locking apparatus 20 is depicted in FIG. 4. However, the user can axially shift the assembly in the outboard direction until limited by the outboard ends of the slot openings 46, thereby bringing the inner periphery portion 36*a* of locking sleeve 36 into locking relationship with the spindle's flat-sided feature 28 to prevent rotation of the spindle 22 with respect to the tubular housing 12; this state of the spindle locking apparatus 20 is depicted in FIG. 5. And when the user releases the locking collar 38, the spring 34 biases the assembly back to the inboard limit position of FIG. 4, leaving the spindle 22 free to rotate.

Figure 3:
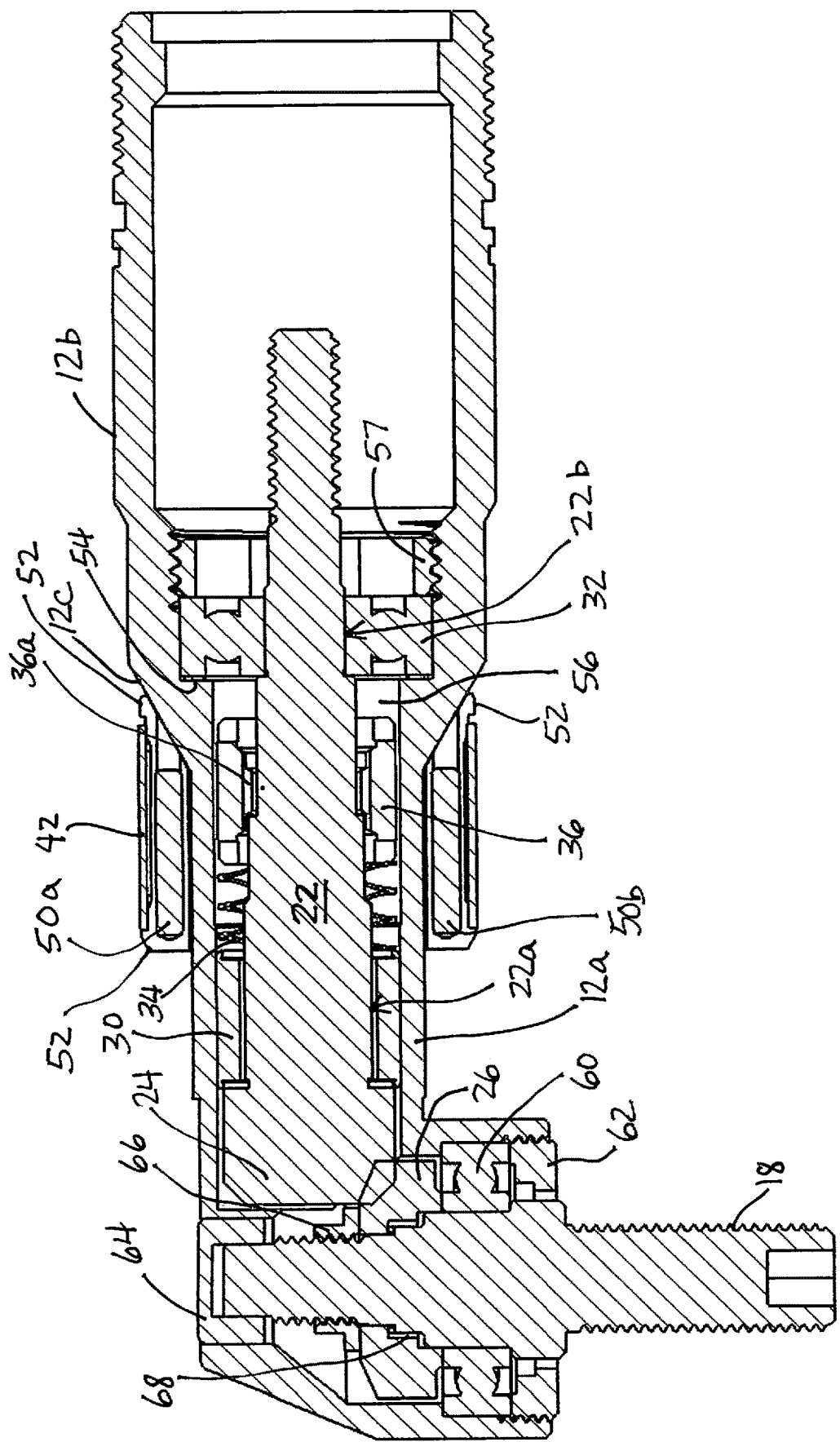
FIG. 3 is a cross-sectional side view of the front housing assembly of FIG. 1.

As also seen in FIGS. 3-5, the flat-sided inner periphery portion 36*a* of said locking sleeve 36 is disposed in a central axial portion of the locking sleeve 36, and the drive pins 40*a*, 40*b* are radially aligned with the inner periphery portion 36*a*. Hence, the force exerted by the drive pins 40*a*, 40*b* acts directly on the inner periphery portion 36*a*, which minimizes any non-axial shifting (cocking, for example) of the locking sleeve 36 when the user axially shifts the locking collar 38.

In a preferred embodiment, the locking collar 38 is constructed by splitting a metal ring of suitable diameter to form the locking collar halves 38*a* and 38*b*. The splitting procedure may be carried out by cutting, for example. Since some material is removed by the splitting procedure, the abutting faces of the locking collar halves 38*a*, 38*b* are recessed (as designated by the reference numeral 39 in FIG. 2) to partially receive upper and lower spacer pins 50*a*, 50*b*, which introduce a small gap between the abutting faces. As mentioned above, the spring band 42 mutually secures the abutting locking collar halves 38*a*, 38*b*, and the spring band 42 is axially retained on the locking collar 38 by front and rear ridges or shoulders 52 formed on the locking collar halves 38*a*, 38*b*. The fully assembled locking collar 38 and spacer pins 50*a*, 50*b* can be seen in the cross-sectional view of FIG. 3.

The cross-sectional views of FIGS. 3-5 illustrate how the spindle 22 and spindle locking apparatus 20 are supported within the tubular housing 12. The front bearing 30 is disposed within the tubular housing portion 12*a* just inboard of the pinion gear 24, while the rear bearing 32 is disposed within the larger diameter portion 12*b* of tubular housing 12. More particularly, the tubular housing 12 is provided with an internal shoulder 12*d*, and the rear bearing 32 and a washer 54 are trapped between the shoulder 12*d* and a lock nut 57 threaded into the inner periphery of tubular collar 12. The spring 34 and locking sleeve 36 of spindle locking apparatus 20 are disposed about the spindle 22 within an annular cavity 56 between the front and rear bearings 30 and 32, with the spring 34 compressed between the front bearing 30 and the outboard face of locking sleeve 36. While the locking pins 40*a*, 40*b* limit the inboard axial travel of the locking sleeve/collar assembly, the inboard axial face of the locking collar 38 is conical to match the conical outer periphery 12*c* of tubular housing 12 to permit sufficient travel of the assembly.

The cross-sectional view of FIG. 3 additionally shows the pinion shaft 18, and how it is supported for rotation within the hub 14 of front housing assembly 10. A main pinion bearing 60 retained within the lower or outboard end of hub 14 by a lock nut 62 supports the lower or outboard end of pinion shaft 18, and an end cap sleeve bearing 64 pressed into the upper end of hub 14 supports the upper or inboard end of pinion shaft 18. The beveled spur gear 26 is disposed just inboard of the main pinion bearing 60, and axially retained by a lock nut 66 threaded onto the pinion shaft 18. A spline connection 68 joins the beveled spur gear 26 to the pinion shaft 18.

In summary, the spindle locking apparatus 20 of the present invention provides a robust and convenient way for the user of a power tool to rotationally lock the power tool's spindle while changing grinder disks or other implements. The apparatus is particularly well suited to retrofit applications because the locking sleeve 36 is easily inserted into the cavity 56 between the spindle 22 and its tubular housing 12, and because the locking collar 38 is constructed as a two-piece clamshell joined to surround the outer periphery of tubular housing 12. Of course, the various elements of the apparatus may be sized differently than shown to suit a given power tool, and may be constructed of metal or plastic, as appropriate. Also, it will be recognized that while the invention has been described in reference to the illustrated embodiments, numerous modifications and variations in addition to those mentioned herein will occur to those skilled in the art. Accordingly, it will be appreciated that systems incorporating these and other modifications and variations still fall within the intended scope of the invention.

The invention claimed is:

1. A user-manipulated spindle locking apparatus for a tool having a cylindrical spindle supported for rotation within a tubular housing, comprising:
   a flat surface formed on an exterior periphery of said spindle;
   a locking sleeve disposed in an annular cavity radially outboard of said spindle and radially inboard of said tubular housing, said locking sleeve having an inner periphery portion shaped to lockingly engage said flat surface of said spindle;

a locking collar disposed radially outboard of said spindle, said locking sleeve and said tubular housing, and axially shiftable on said tubular housing;

first and second axial slot openings in said tubular housing; and first and second drive pins extending through said first and second axial slot openings to mechanically couple said locking collar to said locking sleeve for joint axial motion of said locking collar and said locking sleeve, each such drive pin having an outboard end retained in said locking collar, and an inboard end retained in said locking sleeve, whereby said spindle is prevented from rotating when said locking collar is axially shifted as permitted by an interface between said drive pins and said axial slot openings to bring said inner periphery portion of said locking sleeve into locking engagement with said flat surface of said spindle.

2. The locking apparatus of claim 1, further comprising:
a spring element disposed in said annular cavity so as to bias the locking sleeve away from said flat surface to define a rest or unlocked position in which said spindle is free to rotate within said tubular housing.

3. The locking apparatus of claim 2, where:
said spring is a multi-wave disk spring.

4. The locking apparatus of claim 2, where:
said spring is disposed axially forward of said locking sleeve to bias said locking sleeve axially rearward of said flat surface; and
said locking collar is axially shifted forward against the bias of said spring to bring said inner periphery portion of said locking sleeve into locking engagement with said flat surface.

5. The locking apparatus of claim 1, where:
said inner periphery portion of said locking sleeve is disposed in a central axial location of said locking sleeve, and said drive pins are radially aligned with said inner periphery portion.

6. A user-manipulated spindle locking apparatus for a tool having a cylindrical spindle supported for rotation within a tubular housing, where said spindle locking apparatus is axially shiftable to engage a flat-sided portion of said spindle to prevent rotation of said spindle, said locking apparatus comprising:

a locking sleeve disposed in an annular cavity between said spindle and said tubular housing, said locking sleeve having an inner periphery portion shaped to lockingly engage the flat-sided portion of said spindle;

a locking collar surrounding said tubular housing radially outboard of said locking sleeve, and axially shiftable on said tubular housing, where said locking collar includes left and right halves that are joined around said tubular housing, and mutually fastened;

first and second axial slot openings in said tubular housing; and first and second drive pins extending through said first and second axial slot openings to mechanically couple said locking collar to said locking sleeve, each such drive pin having an outboard end retained in said locking collar, and an inboard end retained in said locking sleeve, whereby said spindle is prevented from rotating when said locking collar is axially shifted as permitted by an interface between said drive pins and said axial slot openings to bring said inner periphery portion of said locking sleeve into locking engagement with the flat-sided portion of said spindle.

7. The locking apparatus of claim 6, further comprising:
a spring steel band clamped around the joined left and right halves to mutually fasten them.

8. The locking apparatus of claim 7, where:
said spring steel band retains said drive pins in said locking collar.

9. The locking apparatus of claim 8, further comprising:
said locking collar includes left and right halves formed by splitting a one piece ring; and
the left and right halves are joined with intervening spacer pins that compensate for ring material lost due to the splitting.

10. The locking apparatus of claim 7, where:
said left and right halves of said locking collar include peripheral ridges that axially retain said spring steel band on said locking collar.

\* \* \* \* \*